United States Patent
Agnoni

(10) Patent No.: US 8,396,049 B2
(45) Date of Patent: Mar. 12, 2013

(54) METHOD AND TRANSCODER ENTITY FOR TANDEM FREE OPERATION IN A TELECOMMUNICATION NETWORK

(75) Inventor: Francesco Agnoni, Cori (IT)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 633 days.

(21) Appl. No.: 12/498,214

(22) Filed: Jul. 6, 2009

(65) Prior Publication Data
US 2011/0002296 A1 Jan. 6, 2011

(51) Int. Cl.
*H04B 7/212* (2006.01)

(52) U.S. Cl. ........ 370/350; 370/329; 370/345; 455/436; 455/442; 455/345

(58) Field of Classification Search .................. None
See application file for complete search history.

(56) References Cited

U.S. PATENT DOCUMENTS

| | | | |
|---|---|---|---|
| 2003/0195011 A1* | 10/2003 | Mayer | 455/517 |
| 2005/0232232 A1* | 10/2005 | Farber et al. | 370/352 |
| 2007/0121572 A1* | 5/2007 | Agnoni et al. | 370/350 |
| 2008/0025283 A1* | 1/2008 | Chin et al. | 370/342 |
| 2010/0110980 A1* | 5/2010 | Hellwig et al. | 370/328 |

OTHER PUBLICATIONS

3GPP TS 28.062 V.7.0.0 "Inband Tandem Free Operation of speech codec—Service description—Stage 3".
3GPP. 3rd Generation Partnership Project; Technical Specification Group Services and System Aspect; Inband Tandem Free Operation (TFO) of Speech Codec: Service Description; Stage 3 Release 7) 3 GPP TS 28.062 v7.0.0. Jun. 2007.

* cited by examiner

*Primary Examiner* — Hassan Phillips
*Assistant Examiner* — Anez Ebrahim

(57) ABSTRACT

A method is described for engaging a first transcoder entity in a tandem free operation session with a second transcoder entity. The transcoder entities control the tandem free operation session and the insertion of transcoders into the session. They also perform a synchronization procedure of the first transcoder entity and the second transcoder entity and send tandem free operation frames. The tandem free operation frames are sent from the first transcoder entity to the second transcoder entity during execution of the synchronization procedure. A transcoder entity and a program embodying the invention is also described.

11 Claims, 6 Drawing Sheets

METHOD AND TRANSCODER ENTITY FOR TANDEM FREE OPERATION IN A TELECOMMUNICATION NETWORK

CROSS-REFERENCE TO RELATED APPLICATIONS

This application claims the benefit of the filing date as provided by 35 U.S.C. 119 of PCT Patent application number PCT/EP2008/058795 filed on Jul. 7, 2008, the disclosure of which is incorporated herein by reference.

BACKGROUND OF THE INVENTION

One of the most important goals of a mobile wireless telecommunication network like the Global System for Mobile communications (GSM) is to provide means for speech transmission between its users.

In a normal call configuration, e.g. between two mobile devices, the speech signal is first encoded in the originating mobile device; the encoding results in a compressed speech signal. In GSM a variety of digital speech coding algorithms are used for the encoding of the speech resulting in different bit rates according to the algorithm. The encoded signal is then sent over the air interface. A transcoder converts the voice channel coding between the GSM coding format and the standard Pulse Code Modulation (PCM) format in communication systems, e.g. converting a 16 kbps signal to a 64 kbps signal, for transmission in other parts of communication networks. The speech signal is transcoded again to a bit rate of 16 kbps in another transcoder, if it is sent through the air interface to the destination mobile device where it is finally decoded. This configuration of the two speech transcoders, which are responsible for the coding and the decoding is called "Tandem Operation". The double transcoding described causes degradation in the speech quality and is therefore problematic.

The speech quality may be improved if the transcoding of the compressed speech signal is avoided. This approach is feasible if the originating and destination devices are adjusted to use the same speech coding algorithms. Tandem Free Operation (TFO) which intends to avoid the transcoding and raise the quality of the speech transmission has been standardized in GSM. TFO is suitable for transmission of wideband speech e.g. with a frequency range of 50-7000 Hz or more as coded according to the Adaptive Multi-Rate (AMR) standards of the International Telecommunication Union or the 3$^{rd}$ Generation Partnership Project (3GPP). Several bit rates are defined as mandatory in the AMR standards. Without TFO it is not possible to transmit wideband speech in PCM based networks.

Tandem Free Operation as defined by the standard 3GPP TS 28.062 version 7.0.0 (2007-06) is intended to avoid the double speech encoding/decoding during a voice call. When the originating and destination devices are using the TFO protocol and the same speech codec, it is possible to transmit the speech frames received from the originating device to the destination device without transcoding the speech signal.

Before transmission of speech under the TFO protocol a synchronization procedure is performed. TFO messages are used in order to achieve the synchronization in a TFO connection and also throughout the TFO as a means for controlling the operation. After synchronization has succeeded, TFO frames are exchanged and TFO is established. The objective of TFO synchronization is to check among others if the transcoder entities participating in the call are capable of TFO and if the codec and the coding standards match e.g. if a device using the GSM coding standard communicates with another device using the GSM coding standard. The TFO frames can contain information on synchronization, codec type, system identification e.g. GSM, absence or presence of embedded TFO messages, and other information.

The TFO protocol as implemented into the transcoder entities is ruled by a state machine which contains, among others, two states, one where the protocol is in regular operation and one where the synchronization of the transcoders participating in a TFO session has been lost. Transition to the state of regular operation occurs when the transcoder entity acting as TFO endpoint starts to receive TFO frames sent to it by its remote TFO partner. Transition to the state where synchronization has been lost occurs when the TFO endpoint stops to receive consecutive TFO frames from the remote side.

In the case of a handover i.e. of a transfer of an ongoing call between different transceivers or transceiver stations connecting a mobile station to the mobile telecommunication network, a new transcoder entity can be introduced into the call. The new transcoder entity which is handling the call after the handover is not synchronized with the distant transcoder entity. As a result of the loss of synchronization the transcoder entity remaining in the call neither receives frames from the transcoder entity handling the TFO before the handover nor from the new one. Loss of synchronization causes a restart of the speech encoding by the transcoder entity acting as a starting point but in this case the encoded speech is generated starting from narrowband speech and not from wideband speech. This results in transmission of lower speech quality, and the quality may be further affected by other resulting effects like a speech path delay jump, speech distortion, or a fallback from wideband speech to narrowband speech for a period of time.

BRIEF SUMMARY OF THE INVENTION

It is an object of the present invention to obviate the above disadvantages and provide an advantageous method for tandem free operation in a telecommunication network.

A method in a telecommunication network is disclosed for engaging a first transcoder entity in a tandem free operation session comprising a second transcoder entity. The transcoder entities control the tandem free operation session and the insertion of transcoders into the session and perform a synchronization procedure of the first transcoder entity and the second transcoder entity. In the proposed method the first transcoder entity sends tandem free operation frames to the second transcoder entity during execution of the synchronization procedure.

Furthermore, the invention can be embodied in a transcoder entity for engagement in a tandem free operation with a second transcoder entity in a telecommunication network. The transcoder entity comprises a controller which controls the tandem free operation session. The controller also controls the insertion of transcoders in the tandem free operation session. Further, the controller performs a synchronization procedure of the transcoder entity and the second transcoder entity and controls the sending of tandem free operation frames between the transcoder entities during the tandem free operation session. The controller sends the tandem free operation frames from the transcoder entity to the second transoder entity during execution of the synchronization procedure.

The method can also be embodied in a program which is, for example, stored on a data carrier or loadable into a transcoder entity, e.g. as a sequence of signals.

The proposed method and transcoder entity allow an advantageous engagement of a transcoder entity in a tandem free operation session with a second transcoder entity while avoiding transmission of low speech quality.

The foregoing and other objects, features and advantages of the present invention will become more apparent in the following detailed description of preferred embodiments as illustrated in the accompanying drawings.

DETAILED DESCRIPTION OF THE DRAWINGS

Figure 1:
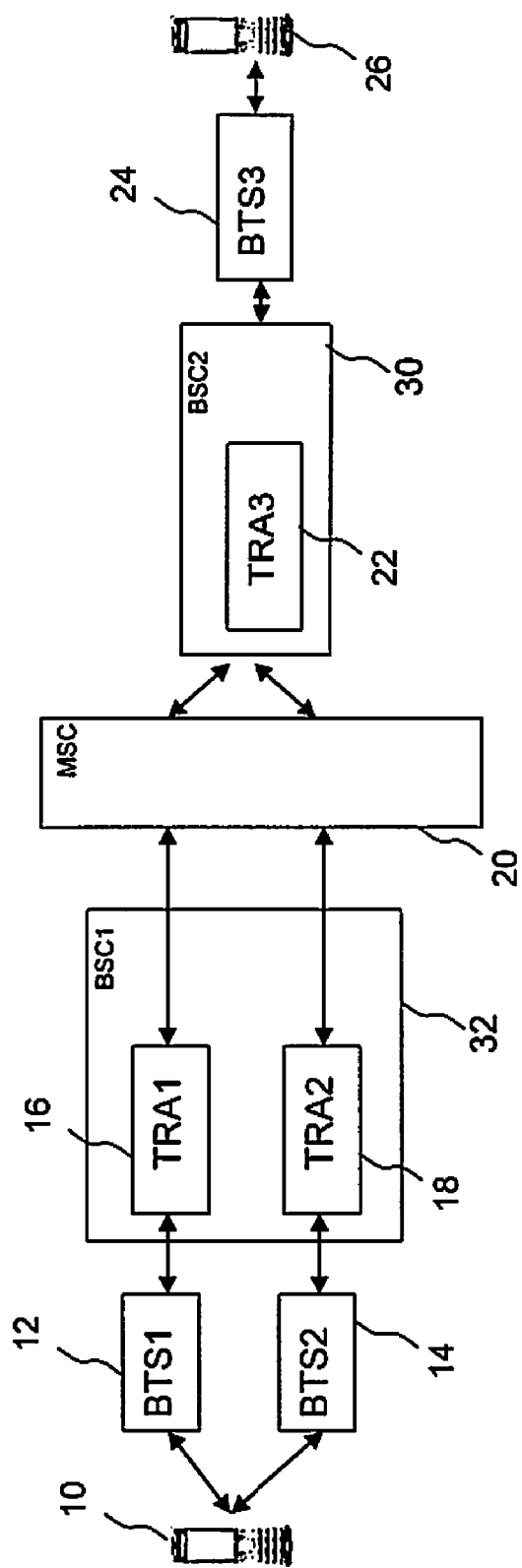
FIG. 1 depicts basic elements of a mobile wireless network

FIG. 1 shows parts of a mobile telecommunications network. Base Transceiver Stations (BTS) (12), (14) and (24) transmit wireless signals, e.g. speech, to mobile devices (10) and (26) and receive signals from them. The BTS are controlled by Base Station Controllers (BSC) (30), (32). Transcoder entities (TRA) (16), (18) and (20), which are typically disposed in a BSC, support the decoding/encoding of speech sent to and from the mobile devices (10) and (26). One or more intermediate networks which, for purpose of simplification, are represented by a Mobile Switching Center (MSC) (20) may also transport speech between the mobile devices (10) and (26).

It is assumed that there is initially an established tandem free operation session in FIG. 1 between mobile device (10) and mobile device (26) and going through base transceiver station (12), transcoder entity (16), mobile switching center (20), transcoder entity (22) and base transceiver station (24). TFO frames are exchanged in both directions. In the event of a handover, transcoder entity (18) is ordered by base transceiver station (14), which is serving mobile device (10) after the handover, to try establishing a new TFO session. While transcoder entities (16), (18) are depicted as parts of the same BSC (32), it is also possible that the transcoder entities are disposed in different BSCs. Transcoder entity (16) quits the above mentioned established tandem free operation session and this causes a loss of synchronization with transcoder entity (22). Transcoder entity (22) may not immediately detect the loss of synchronization with transcoder entity (16) and continue to send TFO frames while also expecting to receive TFO frames. If transcoder entity (22) does not receive three consecutive TFO frames it goes, according to GSM standards, into the state which signifies loss of synchronization. In order for TFO to be re-established in the TFO session, a new synchronization procedure is executed. For this, transcoder entity (18) sends TFO messages to transcoder entity (22) indicating its system identification e.g. GSM and the speech codec type used. Transcoder entity (22) indicates that it supports TFO by sending a TFO message back to transcoder entity (18). If both transcoder entities use compatible speech codecs they can continue the TFO session.

Figure 2:
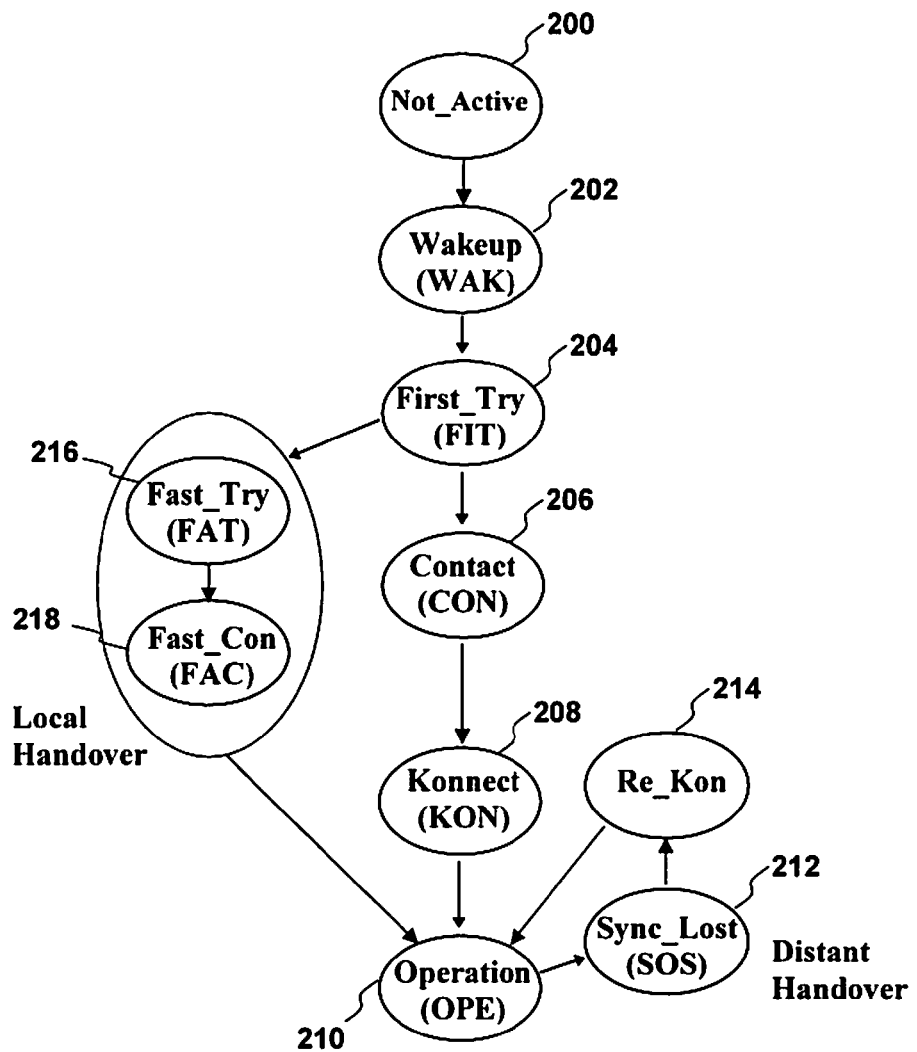
FIG. 2 illustrates a state machine of a tandem free operation

FIG. 2 shows a state machine of the tandem free operation protocol. We can assume that there are two transcoder entities which act as parties in a TFO session, e.g. a local and a distant transcoder entity. The state Not_Active (200) is the initial state of the protocol. In this state the TFO protocol is not active and no speech coding is performed. The state Not_Active (200) is left and a transition to the state Wakeup (WAK) (202) occurs when a new speech call is set up or/and the local transcoder entity is activated and TFO needs to be established. In the state WAK (202) the TFO protocol waits until speech samples are received. Then a transition to the state First_Try (FIT) (204) is performed. In state Contact (CON) (206) request messages are received from the distant transcoder entity. If the codecs used by the TFO partners match, an acknowledgment message is sent to check the digital transparency of the link from the local to the distant transcoder entity. As soon as a TFO_ACK message from the distant transcoder entity has been received, both transcoder entities know that the links in both directions are digitally transparent. TFO Frames start being sent and there is a transition from state CON (206) into the state Konnect (KON) (208). In this state the local transcoder entity sends TFO frames to the distant as long as it receives TFO messages from it. The first received TFO frame causes the transition into the state Operation (OPE) (210). In this state, the transcoder entities exchange TFO frames and the TFO connection is fully operational.

The TFO protocol defines different states depending on whether a handover is a local or a distant one. In the handover described in FIG. 1, resulting in transcoder entity (18) to be ordered by base transceiver station (14) to try establishing a new TFO session, the handover is regarded as a local handover at the side of the transcoder entities (16) and (18) and as a distant handover at the side of the transcoder entity (22). For a local handover, the state machine of the TFO protocol transits to state Fast_Try (FAT) (216) and then to state Fast_Contact (FAC) (218) before transiting to state OPE. For the distant handover, the state machine transits from state OPE (210) to state Sync_Lost (SOS) (212) and can enter state Re_Kon (214) if the distant handover has been confirmed.

Figure 3A:
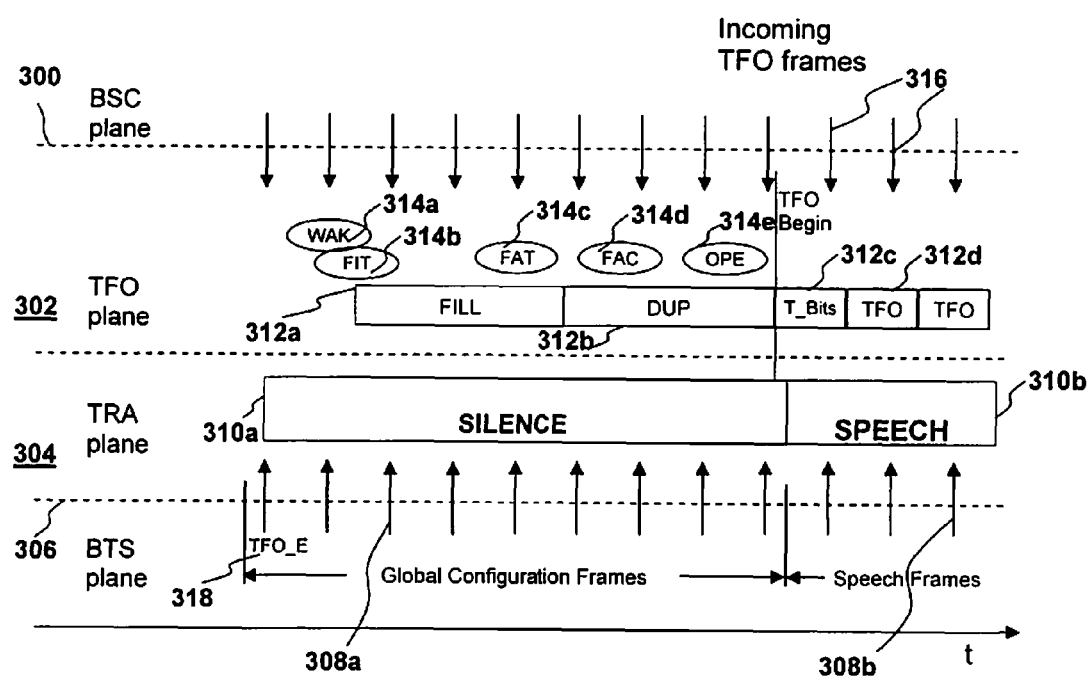
FIG. 3a depicts an establishment of a tandem free operation session in the prior art

As mentioned above, when a handover occurs the new transcoder entity which is inserted in the communication path is ordered to establish a new TFO session. The new transcoder entity is not aware that there was an ongoing TFO session with a distant transcoder entity. FIG. 3a shows the session established as a function of time t simultaneously at the BTS, TRA, TFO and BSC planes. At BTS plane (306) the frames (308a) and (308b) which are sent from the BTS to the transcoder entity are shown. The Global Configuration Frames (308a) contain information on configuration parameters for the communication between the BTS plane and TRA plane. The Speech Frames (308b) contain the speech which is transmitted from the BTS plane to the TRA plane. At TRA plane (304) the speech activity (310a, 310b) is shown. At TFO plane (302) the messages (312a), (312b), (312c) and (312d) that are exchanged between the transcoders and associated states (314a), (314b), (314c), (314d), (314e) of the TFO state machine, for a new TFO session to be established are shown. At BSC plane the flow of incoming TFO frames (306) from the BTS is shown.

An order for a TFO session establishment is made by sending of a TFO enable frame TFO_E (306) from the BTS plane to the TRA plane. This causes the new transcoder entity to transit from state WAK (314a) to state FIT (314b) and to send FILL messages (312a) in order to synchronize with the distant transcoder entity. When the new trancoder realizes reception of three consecutive TFO frames (316) coming from the distant transcoder entity it becomes aware that a TFO session is already ongoing and that a local handover has occured. The new transcoder entity transits to state FAT (314c). A control of the transparency of the the link to the distant TFO partner is performed by sending of TFO_DUP messages (312b). The new transcoder entity transits to the state FAC (314d) if it receives TFO frames followed by TFO messages signifying loss of synchronization from the distant transcoder entity. Then the new transcoder entity transits to state OPE (314e), sends time alignment bits T_bits (312c) and then starts to send TFO frames (312d). Until TFO frames start being received from the new transcoder entity, the distant transcoder entity may transit into the state SOS since it is waiting to receive TFO frames but due to the initiation of the new TFO session it may not received these frames in time. As mentioned before, this transition to state SOS is problematic for the transmission of wideband speech. Transition to state SOS can also introduce a speech path delay and distortion of the speech signal.

Figure 3B:
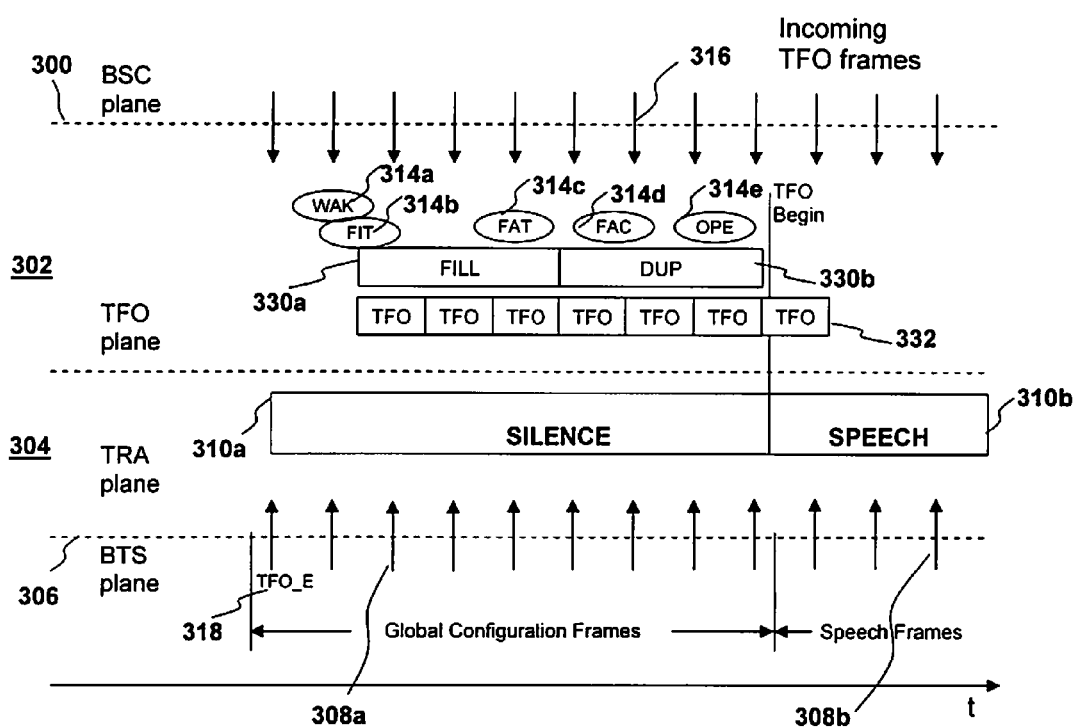
FIG. 3b shows an establishment of a tandem free operation session according to the present invention

FIG. 3b shows the TFO session establishment as a function of time t simultaneously at the BTS, TRA, TFO and BSC planes as suggested in the invention. It presents a solution to the behavior discussed above. Elements which correspond to these in FIG. 3a are designated by corresponding reference signs. However in contrast to FIG. 3a the TFO frames (332) are sent from the new transcoder entity to the distant transcoder entity as soon as the new transcoder entity is ordered to establish a new TFO session with the distant transcoder entity by reception from the BTS level of a TFO enable frame TFO_E (318). In this case as well, the new transcoder entity transits from state WAK (314a) to state FIT (314b) and sends FILL messages (330a) in order to synchronize with the distant transcoder entity. In this case though, the FILL messages (330a) can be embedded in the TFO frames (332) which are sent from the new to the distant transcoder entity. Sending of the TFO frames (332) continues throughout the process of establishment of the new TFO session, i.e. in the states 314c and 314d, and during this period, all TFO messages (330a) and (330b) which are sent from the new transcoder entity to its distant partner for establishing the new TFO session can be embedded in the TFO frames (332). Until speech frames 308b are received, the TFO frames comprise the TFO messages and optionally a default content.

In an embodiment, a timer can be started at the beginning of establishment of the new TFO session. The timer can be set by default to expire after a specified period of time e.g. several seconds. The purpose of the timer is to control the sending of TFO frames from the new to the distant transcoder entity. During this time the process described in FIG. 3b is executed. If the timer expires and the new transcoder entity has not received any TFO frames from the distant transcoder entity, a new try for TFO establishment is initiated in the new transcoder entity. In this case, the synchronization preferably proceeds the sending of TFO frames as described with respect to FIG. 3a and TFO messages sent to the distant partner are sent independently from TFO frames. If on the other hand the new transcoder entity receives TFO frames from the distant transcoder entity before the expiration, the timer is cleared and the normal TFO continues with the two transcoder entities exchanging TFO frames. The timer allows a fallback to the existing synchronization procedure in case that the remote transcoder entity is not able to handle the synchronization according to the proposed method and can avoid malfunctioning of the TFO protocol in case of disturbed communication.

Figure 4:
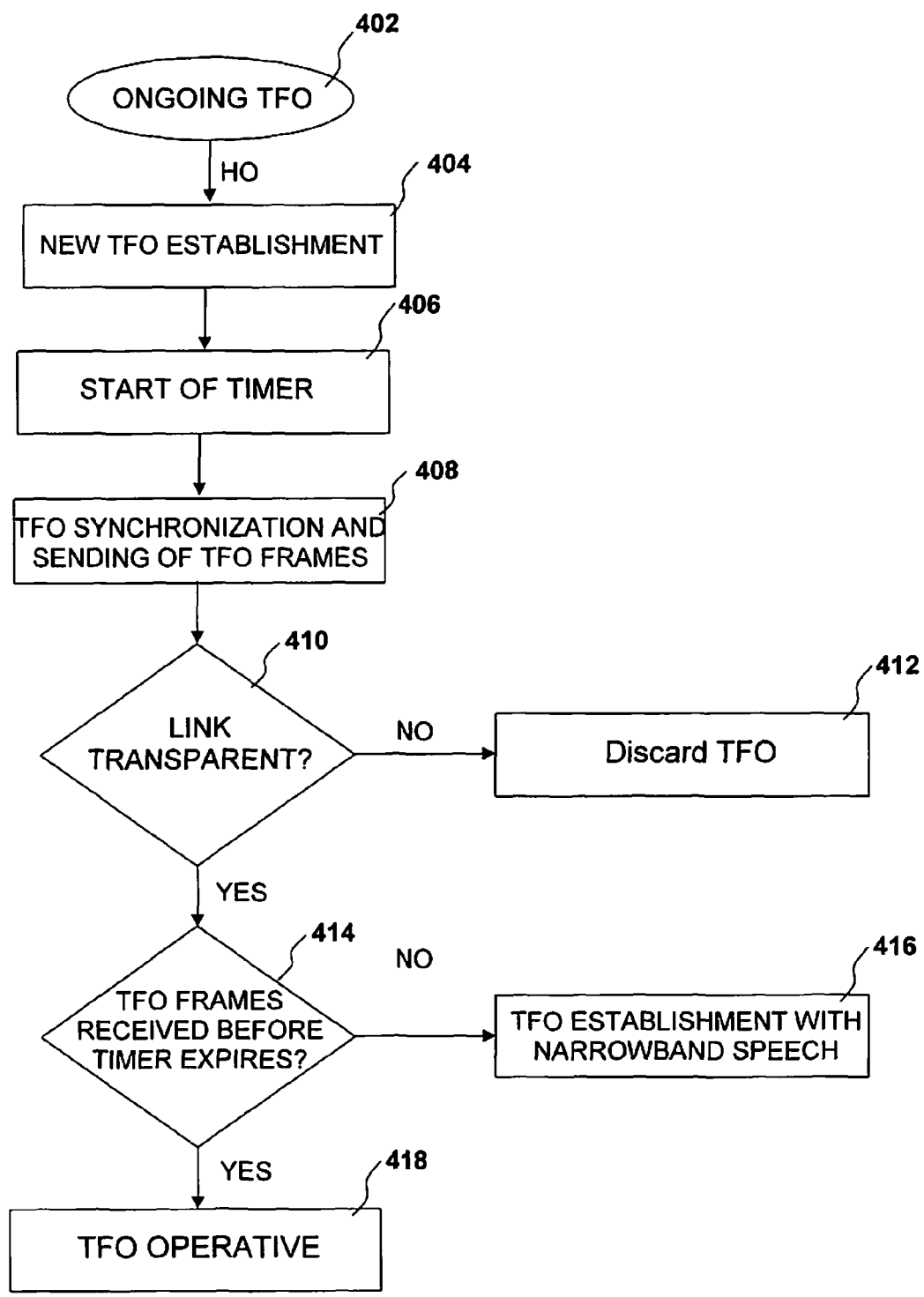
FIG. 4 shows a flow diagram of the proposed method

FIG. 4 shows a flow diagram of the proposed method as executed in the new transcoder entity. When there is an ongoing TFO session (402) between a local and a distant transcoder entity and a handover (HO) occurs then in step (404) a new transcoder entity is ordered to establish a TFO session with the distant transcoder entity. In step (406) a timer is started and in step (408) the new transcoder entity initiates a TFO synchronization procedure while sending simultaneously TFO frames to the distant transcoder entity. In step (410) the new transcoder entity checks if the link to the distant transcoder entity is transparent by exchanging request and acknowledge messages indicating the capability of the distant transcoder entity for TFO. If it is not then in step (412) the TFO is discarded and there is no TFO establishment. In the opposite case there is a check, in step (414), if the new transcoder entity has received TFO frames from the distant transcoder entity before the timer which started at step (406) has expired. If TFO frames have been received TFO is becoming active in step (418) and the timer preferably cleared. If TFO frames have not been received before the expiration of the timer then a new TFO establishment is initialized in step (416) starting from PCM samples with narrowband speech.

In the proposed method the time until the distant transcoder entity receives TFO frames from the new transcoder entity is reduced as the frames are sent as soon as the synchronization is initiated from the new transcoder entity. Due to this, the transition of the TFO state machine in the distant transcoder entity from state OPE to state SOS is avoided and so is the restart of the encoder which uses as output PCM samples with narrowband speech.

The proposed method can be applied in any scenario involving TFO operation and it is e.g. not necessary that the transcoding entities are disposed in a transceiver station and a transcoder entity could for example also be located at a user device or a transit node between different networks. The method is also not restricted to the case of a call from a GSM network but may also be used in a Universal Mobile Telecommunications System (UMTS) network. In a UMTS network a call would be made in a Node-B and a Radio Network Controller (RNC) and a transcoder could e.g. be located in a media gateway. The proposed method can also be applied in the case of a call from a GSM network to a terminal using Voice-over-Internet protocol (VoIP).

Figure 5:
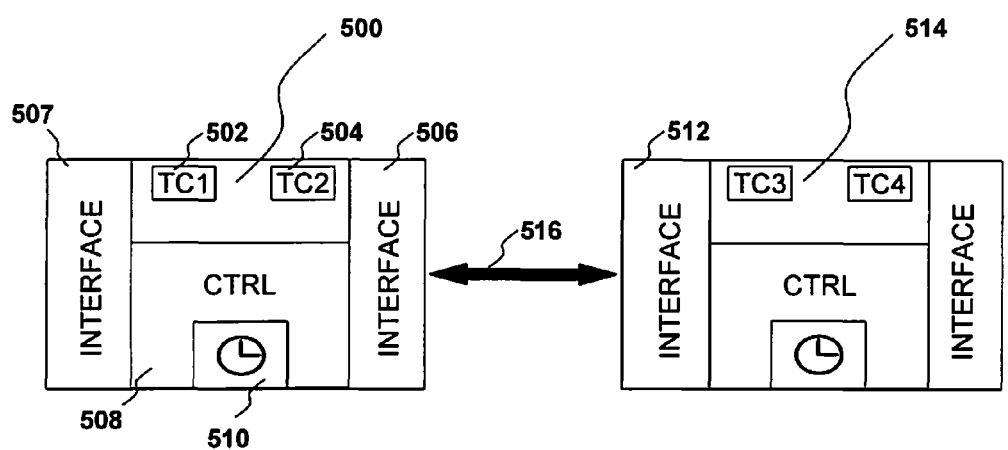
FIG. 5 shows a transcoder entity which is adapted to perform the proposed method

The invention can also be embodied in a transcoder entity (500) which can be adapted to perform any embodiments of the method as described above. An embodiment of such a transcoder entity is shown in FIG. 5. It comprises a controller (508), a timer (510), one or more transcoders (502), (504) and interfaces (506) and (507) which can be adapted to exchange signals, messages or frames for communication with external entities or devices.

The controller (508) is adapted to control a tandem free operation session with another transcoder entity e.g. transcoder entity (514). The controller (508) is also adapted to control the insertion of transcoders e.g. transcoders (502) and (504), into the tandem free operation session and their removal. The controller (508) is further adapted to perform synchronization procedures of transcoder entity (500) with transcoder entity (514). For this, through interface (506), TFO messages indicating the transcoder entity's system identification e.g. GSM and the speech codec type used, are sent from transcoder entity (500) and received through interface (512) from transcoder entity (514). Transcoder entity (514) indicates that it supports TFO by sending, through interface (512), a TFO message back to transcoder entity (500). The controller (508) is also adapted to control the sending of TFO frames from transcoder entity (500) to transcoder entity (514) during a TFO session. Communication between transcoder entity (500) and transcoder entity (514) is shown by arrow (516).

Controller (508) is adapted to control the sending of TFO frames from transcoder entity (500) to transcoder entity (514) during execution of the synchronization procedure. In this case, the TFO messages which are sent, for the purpose of synchronization, from transcoder entity (500) to transcoder entity (514) can be embedded in the TFO frames.

The controller (508) can comprise a timer (510) which is adapted to define the time period that controller (508) sends the TFO frames from transcoder entity (500) to transcoder entity (514). An expiration of the timer leads to initiation of a new synchronization procedure.

The elements of the transcoder entity as described above can be implemented as hardware or software or any combination of the two.

The above embodiments admirably achieve the objects of the invention.

However, it will be appreciated that departures can be made by those skilled in the art without departing from the scope of the invention.

The invention claimed is:

1. A method in a telecommunication network of engaging a new transcoder device in an ongoing tandem free operation (TFO) session between a first transcoder device and a second transcoder device, the method comprising the steps of:
   controlling the tandem free operation session and insertion of transcoders into the session,
   wherein the new transcoder device is inserted into the session after a handover and the second transcoder device remains in the session during the handover;
   starting a timer for a predefined time period:
   the new transcoder device initiating a synchronization procedure of the new transcoder device and the second transcoder device while, simultaneously,
   embedding messages in the tandem free operation frames, which are sent to the second transcoder device during the execution of the synchronization procedure for controlling the tandem free operation;
   and the new transcoder device receiving TFO frames from the second transcoder device,
   before the timer expires, causing a TFO between the new transcoder device and the second transcoder device to become active.

2. The method according claim 1, further comprising
   exchanging operation information for engaging the new transcoder device and the second transcoder device in the tandem free operation session between the two transcoder entities by executing the synchronization procedure of the new transcoder device and the second transcoder device.

3. The method according to claim 1 claim, wherein the tandem free operation frames comprise wideband speech.

4. The method according to any preceding claim, wherein a time period of sending the tandem free operation frames is controlled by the timer.

5. The method according to claim 4, wherein at expiry of the timer a new synchronization procedure is initiated.

6. The method according to claim 1, wherein the tandem free operation in the second transcoder device comprises an operation state, wherein tandem free operation frames from the new transcoder device are received by the second transcoder device and wherein a transition to a non-operation state occurs when the second transcoder device stops receiving consecutive tandem free operation frames from the new transcoder device.

7. A transcoder device in a telecommunication network, the transcoder device being arranged for engaging in ongoing tandem free operation session between a first transcoder device and a second transcoder device, the transcoder device comprising:
   a controller for
      controlling the tandem free operation session and insertion of transcoders into the session, wherein the new transcoder device is inserted into the session after a handover and the second transcoder device remains in the session during the handover;
   starting a timer for a predefined time period:
   the transcoder device initiating a synchronization procedure of the transcoder device and the second transcoder device while, simultaneously, embedding messages in the tandem free operation frames, which are sent the second transcoder device during the execution of the synchronization procedure for controlling the tandem free operation; and
   the transcoder device receiving TFO frames from the second transcoder device, before the timer expires, causing a TFO between the transcoder device and the second transcoder device to become active.

8. The transcoder device according to claim 7, wherein the timer is for setting a predefined time period of sending the tandem free operation frames.

9. The transcoder device according to claim 8, wherein the controller is arranged to initiate a new synchronization procedure at expiry of the time period.

10. The transcoder device according claim 7, the controller being arranged for exchanging operation information, for engaging the transcoder device and the second transcoder device in the tandem free operation session between the two transcoder devices, by executing the synchronization procedure of the transcoder device and the second transcoder device.

11. The transcoder device according to claim 7, wherein the tandem free operation frames comprise wideband speech.

* * * * *